United States Patent Office 3,308,077
Patented Mar. 7, 1967

3,308,077
AQUEOUS COATING COMPOSITIONS COMPRISING AN ACIDIC ESTER PREPARED FROM A MALEINIZED FATTY ACID AND A PARTIALLY ESTERIFIED POLYOL
James Parker Pattison, Etobicoke, Ontario, and Reinhold Adelbert Preik, Toronto, Ontario, Canada, assignors to Canadian Industries Limited, Quebec, Quebec, Canada, a corporation of Canada
No Drawing. Filed Dec. 20, 1963, Ser. No. 332,253
Claims priority, application Great Britain, Dec. 21, 1962, 48,471/62
8 Claims. (Cl. 260—23).

This invention relates to new coating compositions.

As is generally known, paint compositions consist essentially of a base which may be a raw oil, a processed oil, or a combination of an oil and a resinous material dissolved in a volatile organic solvent, in which a pigment is dispersed. Many attempts have been made to replace the volatile organic solvent by an aqueous dispersion medium, the advantages to be gained by such replacement being those of cheapness, elimination of fire risks, smell and poisonous fumes, and in a number of cases the elimination of the costly and troublesome process of grinding the pigment into the medium, since a number of pigments are obtained during their processing in the form of a highly dispersed aqueous paste which it is necessary to dry and redisperse by an expensive grinding process. By employing a base dispersed in an aqueous medium, these highly dispersed aqueous pastes can be employed directly without any subsequent drying or grinding processes.

Water paints of certain types have been known and employed for decorative and protective purposes for a long time. Some of those paints, however, consist of emulsions of oils, varnish bases or synthetic resins in water, obtained with the aid of appropriate emulsifying agents, and on drying do not yield homogeneous films and correspondingly yield flat or matt surfaces. Others consist of true aqueous solutions of synthetic resins and yield homogeneous and glossy films but these films have been found to lack the necessary water resistance.

It is an object of this invention to provide new paint compositions, enamels and the like, in which water is employed as dispersion medium, instead of the more usual volatile solvents. Another object is to provide such coating compositions which are capable of drying to matt as well as glossy films which are completely water resistant. Additional objects will appear hereinafter.

The aqueous coating compositions of this invention contain as their essential ingredient, a water-soluble or water-dispersible salt of a resinous ester obtained by partially esterifying a polyol having at least three hydroxyl groups per molecule and a molecular weight of at least about 500 with drying oil fatty acid, further esterifying the resultant drying oil ester with maleinized fatty acid, and substantially completely neutralizing the resultant resinous ester with a substantially aqueous solution or dispersion of a volatile base.

In a more specific embodiment, the aqueous coating compositions of the invention contain as essential ingredient a water-soluble or water-dispersible salt of a resinous ester obtained by partially esterifying one mole of polyhydroxy compound having at least three, preferably five, hydroxyl groups per molecule and a molecular weight of at least about 500, preferably from 1000 to 2000, with at least two moles of drying oil fatty acid, thereafter esterifying at least part of the remaining unesterified hydroxyl groups of the polyol with maleinized fatty acid, and finally neutralizing substantially completely the resultant resinous ester with an aqueous solution or dispersion of a volatile base, which solution or dispersion may also contain a minor proportion of an organic solvent such as ethylene glycol monobutyl ether, hexyl and octyl alcohols, glycols, Cellosolves, etc.

The partial esterification of the polyol with the drying oil fatty acid is suitably conducted at a temperature of from 350° to 425° F. until the acid value of the reaction mixture is practically zero, while the further esterification with the maleinized fatty acid is suitably conducted at a temperature and for a period of time such that one of the carboxyl groups comprising the anhydride in the maleinized acid is reacted with the partially esterified polyol while reaction of the other carboxyl group of the anhydride is minimized and reaction of the fatty acid carboxyl group is substantially prevented, viz. a temperature of from 200° to 230° F. for about 1.5 hours. The neutralization is conveniently carried out at room temperature and after addition of pigment and other desired additive, the composition is thinned down to the required consistency with water preferably containing a small amount of an organic solvent such as ethylene glycol monobutyl ether, hexyl and octyl alcohols, etc.

Instead of using a polyol as raw material and partially esterifying it with drying oil fatty acid, one can start with an epoxy resin, viz. a condensation product of epichlorohydrin and diphenylolpropane, and inactivate the epoxide groups thereof by reaction with drying oil fatty acid, thus obtaining an equivalent product having free hydroxyl groups. Epoxide-containing polymers other than epoxy resins can also be used in this manner.

Amongst the very wide range of polyols suitable as raw materials for the preparation of the resinous salts of the compositions of this invention, there may be mentioned polyether condensates of polyhydric alcohols and olefine oxides, such as the condensates of glycerol and ethylene or propylene oxide; hydroxyl-containing esters and polyesters, being condensates of polyhydric alcohols and polybasic acids, such as the condensates of two moles of glycerol and one mole of adipic acid; hydroxyl-containing alkyd resins; hydroxyl-containing epoxy resins; styrene/allyl alcohol copolymers such as the styrene/allyl alcohol copolymers containing from 30% to 80% by weight of copolymerized styrene prepared by heating a liquid mixture of allyl alcohol and from 10% to 40% styrene in the presence of oxygen; and copolymers of ethylenically unsaturated monomers including a copolymerized monomer such as beta-hydroxyethyl or beta-hydroxypropyl methacrylate or N-methylol acrylamide or methacrylamide and having at least three hydroxyl groups per molecule.

The drying oil fatty acids used for the partial esterification of the polyols are the unsaturated fatty acids of 12 to 20 carbon atoms having an iodine number of 85 or higher. While fatty acids containing a single olefinic bond such as, for example, oleic acid, lauroleic acid, palmitoleic acid or gadoleic acid can be used, it is preferable to employ more unsaturated fatty acids such as linoleic or linolenic acid. Particularly suited are the drying oil fatty acids obtained as a mixture of individual acids by hydrolysis of natural drying oils such as linseed oil, soya bean oil, perilla oil and the like. Also the unsaturated fatty acids obtained by hydrolysis of drying oils which have been treated so as to effect conjugation of the double bonds, as by alkali isomerization, are very suitable for partial esterification of the polyols.

By "maleinized fatty acid" is meant the resinous material obtained by heating to an elevated temperature, e.g. a temperature of from 400° to 500° F., a mixture of maleic anhydride with fatty acid, usually in a 1/1 mole ratio. Examples of fatty acids suitable for maleinization are the drying oil fatty acids above mentioned.

Any volatile base may be employed in aqueous solution or dispersion for the final neutralization of the resinous ester, such as ammonia, triethylamine and diethylethanolamine. Non-volatile bases could obviously be used but volatile ones are preferred since they are to a large extent driven off with the evaporation of water from the films after the coating compositions have been so applied to substrates.

The coating compositions of this invention may be employed for the production of paints and enamels which dry and yield films which may possess a glossy surface. On evaporation of the water, the films obtained are temporarily still water-sensitive, but on standing for a period at ordinary temperatures (which period is considerably shortened at elevated temperatures), the films dry hard and insoluble in much the same manner as normal paint films which are dissolved in organic solvents. The drying period may also be accelerated by the addition of driers such as cobalt naphthenate to the compositions.

The coating compositions may also be employed as baking enamels by incorporating therewith thermosetting aminoplast resins and, if necessary, acid catalysts. These latter resins are the ordinary or the alkylated aminoplast resins of the art, such as the alkylated and non-alkylated urea-aldehyde resins, melamine-aldehyde resins, dicyandiamide-aldehyde resins and other aminoplast-aldehyde resins such as those triazine resins produced by the reaction of an aldehyde with formoguanamine, ammeline, 2-chloro-4, 6-diamino-1,3,5-triazine, 2-phenyl-p-oxy-4, 6-diamino-1,3,5-triazine, 6-methyl-2-, 4-diamino-1,3,5-triazine, 2,4-6-trihydrazine-1,3,5-triazine, and 2,4,6-triethyl-triamino-1,3,5-triazine. As aldehydes used to react with the amino compounds to form the aminoplast resins, one may use such aldehydes as formaldehyde, acetaldehyde, crotonaldehyde, acrolein or compounds which engender aldehydes such as hexamethylenetetramine, paraldehyde, paraformaldehyde, trioxymethylene and the like. Still further, one may use aromatic or heterocyclic aldehydes such as benzaldehyde, furfural and the like. Amongst the mono- and polyhydric alcohols which may be used in the preparation of the alkylated aminoplast resins are methanol, ethanol, isopropanol, butanol, isobutanol, ethyl hexanol, lauryl alcohol, stearyl alcohol and the like. Suitable acid catalysts include sulphuric, hydrochloric and phosphoric acids together with their organic derivatives such as n-butyl phosphoric acid, p-toluene sulphonic acid, trichloroacetic acid and such acid-yielding compounds as borontrifluoride etherate.

The aminoplast resins, when incorporated with the coating compositions of this invention to render them useful as baking enamels, are preferably present in the compositions in a concentration ranging from 5% to 100% by weight of the water-soluble or water-dispersible salts and the acid catalysts should suitably be present in a concentration of from 0.01% to 2.0% by weight of the said salts.

The coating compositions may be applied to substrates by brushing, spraying or by means of rollers, the substrates being metal, wood, plaster and like surfaces.

The following examples further illustrate the invention which, however, is not to be limited to the embodiments shown therein.

Example 1

Two moles (196 g.) of maleic anhydride were added to two moles (556 g.) of tall oil fatty acids and the mixture was heated at 500° F. for three hours.

To one mole (1600 g.) of a 50/50 styrene/allyl alcohol copolymer having a molecular weight of about 1600 and contaning about 5.5 hydroxyl groups per molecule, there were added 3 moles (834 g.) of dehydrated castor oil fatty acids and toluene (230 g.). Water was distilled azeotropically from the mixture by heating it to 400° F. for about 4 hours until the acid value dropped to 3 mg. KOH per gram. The mixture was then cooled to 230° F. and 2 moles (752 g.) of the above maleinized tall oil fatty acids were added thereto, followed by a two hour reaction at 230° F. The reaction product was allowed to cool to 200° F. and was then dissolved to 40% total solids in a mixture of 280 g. of ethylene glycol monobutyl ether, 240 g. of 28% ammonia and 4114 g. of water. The resultant solution was clear and viscous and had a pH of 8.5.

Example 2

2.7 moles (742 g.) of tall oil fatty acids were heated at 400° F. with 1 mole (1600 g.) of the styrene/allyl alcohol copolymer described in Example 1 until the acid value dropped to 3 mg. KOH per gram. The resulting ester was cooled to 230° F., blended with 1.3 moles (502 g.) of the maleinized tall oil fatty acids described in Example 1, and then maintained at 230° F. for 2 hours. There were then added 260 g. of triethylamine, 870 g. of ethylene glycol monobutyl ether and 1618 g. of water, forming a clear solution at 50% total solids having a pH of about 8.5.

Example 3

One mole (1150 g.) of a styrene/allyl alcohol copolymer was heated at 400° F. with 2.2 moles (611 g.) of tall oil fatty acids to an acid value of 3 mg. KOH per g. After cooling to 230° F., 1.5 mole (567 g.) of the maleinized tall oil fatty acids of Example 1 were added and the mixture maintained for 2 hours at 230° F. The reaction product was neutralized with 303 g. of triethylamine and dissolved in a mixture of 230 g. of ethylene glycol monobutyl ether and 2859 g. of water. The resulting solution had a non-volatile content of 40% and was clear and viscous.

Example 4

To 600 g. of each of the aqueous resinous solutions of Examples 1, 2 and 3, there were added 200 g. of water and 2.0 g. of potassium tripolyphosphate dispersing agent, and into each mixture were sifted 1200 g. of rutile titanium dioxide pigment and the pigment dispersed by means of a Cowles dissolver. Each dispersion was then blended with a further 1900 g. of resinous solution, 7 g. of a water-soluble silicone resin and 21 g. of a drier solution containing 6% of cobalt being then stirred in, followed by 230 g. of water. The resulting enamels had a viscosity suitable for brushing and gave paint films which air dried well, had a high gloss and rapidly developed water-resistance.

Example 5

A baking primer suitable for protecting metal substrates was prepared by first dispersing in a ball mill 102 g. of iron oxide, 620 g. of barytes, 93 g. of titanium dioxide, 5 g. of carbon black and 185 g. of fibrous talc in a mixture of 294 g. of the final resinous solution of Example 2 and 440 g. of water. An additional 826 g. of resinous solution was then added to the dispersion together with 50 g. of water-soluble melamine-formaldehyde resin. 10 g. of cobalt naphthenate were then stirred in as well as 50 g. of ethylene glycol monobutyl ether, after which the mixture was diluted with water to 40% total solids. The resultant composition was sprayed on a metallic panel and baked thereon for one hour at 300° F., yielding a hard, sandable film suitable for topcoating with enamels.

Example 6

356.5 g. of a styrene/allyl alcohol copolymer having a molecular weight of 750 and a hydroxyl equivalent of 0.75 per 100 g. were esterified at 400°–420° F. with 465.5 g. of tall oil fatty acids to an acid value of less than 2 mg. KOH per gram. The mixture was then cooled to 230° F. and 178 g. of maleinized tall oil fatty acids (previously prepared by heating an equimolecular mixture of maleic anhydride and tall oil fatty acids at 400° F. for 3.5 hours) were added thereto, followed by a 1.75 hour reaction at 230° F. 144 g. of 2,3-dimethyl-2,3-butane diol were then added and the temperature held at 230° F. for a further 30 minutes. On cooling to 200° F., the resinous ester was neutralized with 99 g. of triethylamine.

*Example 7*

279.5 g. of an epoxy resin having a molecular weight of 520 and a hydroxyl equivalent of 0.95 per 100 g. were esterified at 480° F. with 547 g. of tall oil fatty acids to an acid value of 1.7 mg. KOH per gram. The mixture was then cooled to 230° F. and 172.5 g. of the maleinized tall oil fatty acids of Example 6 were added thereto, followed by an 8 hour reaction at 230° F. 144 g. of 2,3-dimethyl-2,3-butane diol were then added and the temperature held at 230° F. for a further 30 minutes. On cooling to 200° F., the resinous ester was neutralized with 94 g. of triethylamine.

*Example 8*

An acrylic copolymer was prepared by adding over a 2 hour period to 1250 g. of refluxing isopropyl alcohol containing 10% of toluol, the following monomeric mixture:

|  | G. |
|---|---|
| Methyl methacrylate | 625 |
| Butyl methacrylate | 488 |
| Glycidyl methacrylate | 137 |
| Benzene thiol | 40 |
| Azo di-isobutyronitrile | 37.5 |

Refluxing was continued for a further 3 hours and the solvent then distilled off, 267 g. of tall oil fatty acids being added towards the end of the distillation. As the solvent removal was completed and the temperature had risen to 380°–400° F., the acid value dropped to less than 2 mg. KOH per gram. The product was then cooled to 250° F. and 338 g. of the maleinized tall oil fatty acids of Example 6 added, followed by a 2 hour reaction at 240° F. The resinous ester was neutralized with 185 g. of triethylamine and diluted with 472 g. of a mixture of isopropanol and propylene glycol.

*Example 9*

In 123.8 g. of each of the resinous ester of Examples 6, 7 and 8, there were dispersed 120 g. of titanium dioxide pigment, 2.2 g. of cobalt drier and 3.7 g. of a 20% aqueous solution of silicone resin, by means of a Cowles dissolver.

The first two dispersions were diluted with 55 g. of 2,3-dimethy-2,3-butane diol and about 75 g. of water until a suitable viscosity was reached for brush application, while the third dispersion was diluted with 45 g. of 1-hexanol and about 240 g. of water.

Each of the resultant enamels was brushed out and air-dried to a water-resistant film having a high gloss.

*Example 10*

In this example, all parts given are by weight unless otherwise specified.

281 parts of linseed oil fatty acids and 98 parts of maleic anhydride were heated to 200° C. for 3.5 hours, after which time the free maleic anhydride content was very low.

525 parts of an epoxy resin having a melting point of 94°–105° C., an epoxide equivalent of 870–1025 and an average molecular weight of 1400, 252 parts of dehydrated castor oil fatty acids and 50 parts of xylene were heated at 200°–220° C. until the acid value had fallen to below 5 mg. KOH per gram. The reaction mixture was cooled to 100° C. and 342 parts of the above maleinized linseed oil fatty acids were added thereto. The temperature was raised to 110° C. and so maintained for 45 minutes when the acid value was found to be 84 mg. KOH per gram.

The product was diluted to 80% total solids with ethylene glycol monobutyl ether and sufficient diethanolamine was added to neutralize half of the free acidity of the resin solution. The thus neutralized product was then diluted with water to 30% total solids to form a stable suspension of the resinous ester.

What we claim is:

1. An aqueous coating composition containing as its essential ingredient a salt of a resinous ester obtained by partially esterifying one mole of a polyol having at least three hydroxyl groups per molecule and a molecular weight of at least about 500 with at least two moles of a drying oil fatty acid until the acid value of the reaction mixture has fallen below 5, thereafter esterifying at least part of the remaining unesterified hydroxyl groups of the polyol at a temperature not exceeding 240° F. with maleinized fatty acid prepared by heating a mixture of maleic anhydride with fatty acid in a mole ratio of about 1:1, and substantially completely neutralizing the resultant resinous ester with a volatile base.

2. A process for preparing an aqueous coating composition which comprises, essentially, partially esterifying one mole of a polyol having at least three hydroxyl groups per molecule and a molecular weight of at least about 500 with at least two moles of a drying oil fatty acid until the acid value of the reaction mixture has fallen below 5, thereafter esterifying at least part of the remaining unesterified hydroxyl groups of the polyol at a temperature not exceeding 240° F. with maleinized fatty acid prepared by heating a mixture of maleic anhydride with fatty acid in a mole ratio of about 1:1, and substantially completely neutralizing the resultant resinous ester with a volatile base.

3. A process as claimed in claim 2 wherein the partial esterification of the polyol with the fatty acid is carried out at a temperature of from 350° to 425° F. and the further esterification with maleinized fatty acid is carried out at a temperature of from 200° to 230° F.

4. An aqueous coating composition as claimed in claim 1 wherein the polyol has a molecular weight of from 1000 to 2000.

5. An aqueous coating composition as claimed in claim 1 wherein the polyol is a copolymer of styrene and allyl alcohol.

6. An aqueous coating composition as claimed in claim 4 wherein the polyol is a copolymer of styrene and allyl alcohol.

7. A process as claimed in claim 2 wherein the polyol is a copolymer of styrene and allyl alcohol.

8. A process as claimed in claim 3 wherein the polyol is a copolymer of styrene and allyl alcohol.

References Cited by the Examiner

UNITED STATES PATENTS

| 2,596,737 | 5/1952 | Tess et al. | 260—23 |
| 2,820,711 | 1/1958 | Kiebler et al. | 106—34 |
| 3,012,485 | 12/1961 | Bradley | 260—18 |
| 3,014,881 | 12/1961 | LaBarre | 260—18 |
| 3,069,371 | 12/1962 | Carney et al. | 260—23 |
| 3,098,834 | 7/1963 | Jerabek | 260—23.7 |

LEON J. BERCOVITZ, *Primary Examiner.*

R. A. WHITE, *Assistant Examiner.*